Feb. 9, 1971 R. E. PACKARD 3,562,713

METHOD AND APPARATUS FOR ESTABLISHING A BRANCH COMMUNICATION IN A DIGITAL COMPUTER

Filed March 17, 1967 2 Sheets-Sheet 1

INVENTOR
ROGER E. PACKARD
BY
Christie, Parker & Hale
ATTORNEYS.

United States Patent Office 3,562,713

Patented Feb. 9, 1971

3,562,713

METHOD AND APPARATUS FOR ESTABLISHING A BRANCH COMMUNICATION IN A DIGITAL COMPUTER

Roger E. Packard, Glendora, Calif., assignor to Burroughs Corporation, Detroit, Mich., a corporation of Michigan Filed Mar. 17, 1967, Ser. No. 623,858
Int. Cl. G06f *9/18*
U.S. Cl. 340—172.5 19 Claims

ABSTRACT OF THE DISCLOSURE

A method for establishing a direct branch communication from an object program to a subroutine of the master control program without resorting to hardware. The master control program includes address words identifying the locations in memory of the subroutines to which a direct branch communication is desired. Each address word includes a unique flag digit. When an object program attempts to establish a branch communication to a subroutine in the master control program by fetching one of the address words, the communication is in fact only established if the fetched word contains the flag digit. The same steps initiate the execution of a test routine either in the event the information called by the object program does not contain the flag digit or in the event a hardware interruption takes place.

Apparatus for establishing the direct branch communication includes a first register for storing computer instructions, a second register for storing a memory address, and a third register for storing information to be exchanged with the location in the computer memory identified by the address stored in the second register. Responsive to the storage of a branch communication instruction in the first register, a gate transfers a selected address word identifying the location in the memory of a subroutine from the memory to the third register. A check circuit inspects the selected address word to determine if a flag digit is present. Responsive to the presence of the flag digit, a gate transfers the selected address word to the second register to initiate execution of the corresponding subroutine.

BACKGROUND OF THE INVENTION

This invention relates to digital computers and, more particularly, to a method and apparatus for establishing a direct branch communication from an object program to a subroutine in the master control program.

In digital computers, it is common practice to operate on a multiple program basis. These programs, called object or user programs, are carried out under the supervision of a master control program. The master control program is created before the computer is put into service and is normally not altered thereafter. After a computer goes into service, however, it is continually called upon to carry out new object programs, as new jobs arise. As a result, any programmatic errors occurring in the course of the operation of the computer are ordinarily attributable to an object program, rather than the master control program. For this reason, all operations in the computer are generally carried out under the supervision of the master control program in such a way that a programmatic error in one object program will not completely disable the operation of the entire computer. Thus the other object programs can still be carried out despite the presence of an error in an object program.

Generally speaking, the master control program will have many different subroutines that branch off of several basic routines. In order for an object program to communicate with a particular subroutine in the master control program, a hardware connection from the object program to the basic routine is customarily established Use of such a hardware connection to establish the branch communication obviates the possibility of programmatic error disabling the operation of the entire computer. After the hardware connection to a basic routine in the master control program is established, the computer must first proceed through the various branches of the routine to arrive at the selected subroutine. This substantially increases the time required to execute the subroutine. On the other hand, the provision of direct hardware connections to each subroutine in order to reduce this time would be extremely expensive, due to the large number of subroutines generally found in a master control program.

SUMMARY OF THE INVENTION

According to the invention, a direct branch communication from an object program to a subroutine in the master control program is established by programmatic means. Thus, address words identifying the location in computer memory of each subroutine are included in the master control program. To establish a branch communication, the object program calls for the address word of the desired subroutine from memory. Each subroutine address word contains a unique, flag digit. Before the instructions of the subroutine corresponding to the address word are fetched from memory, the address word is checked for the presence of the flag digit. The subroutine is only executed if the selected address word contains the flag digit.

According to a feature of the invention, a test subroutine is initiated by means of the same steps that initiate the other subroutines if the address word called for by the object program fails to contain the flag digit. The test subroutine also has an address word containing the unique, flag digit stored in the computer memory. Therefore it is executed without interference from the flag check mechanism. The same test routine is artificially initiated when the operation of computer hardware, such as input/output equipment is interrupted.

DESCRIPTION OF A SPECIFIC EMBODIMENT

Figure 1:
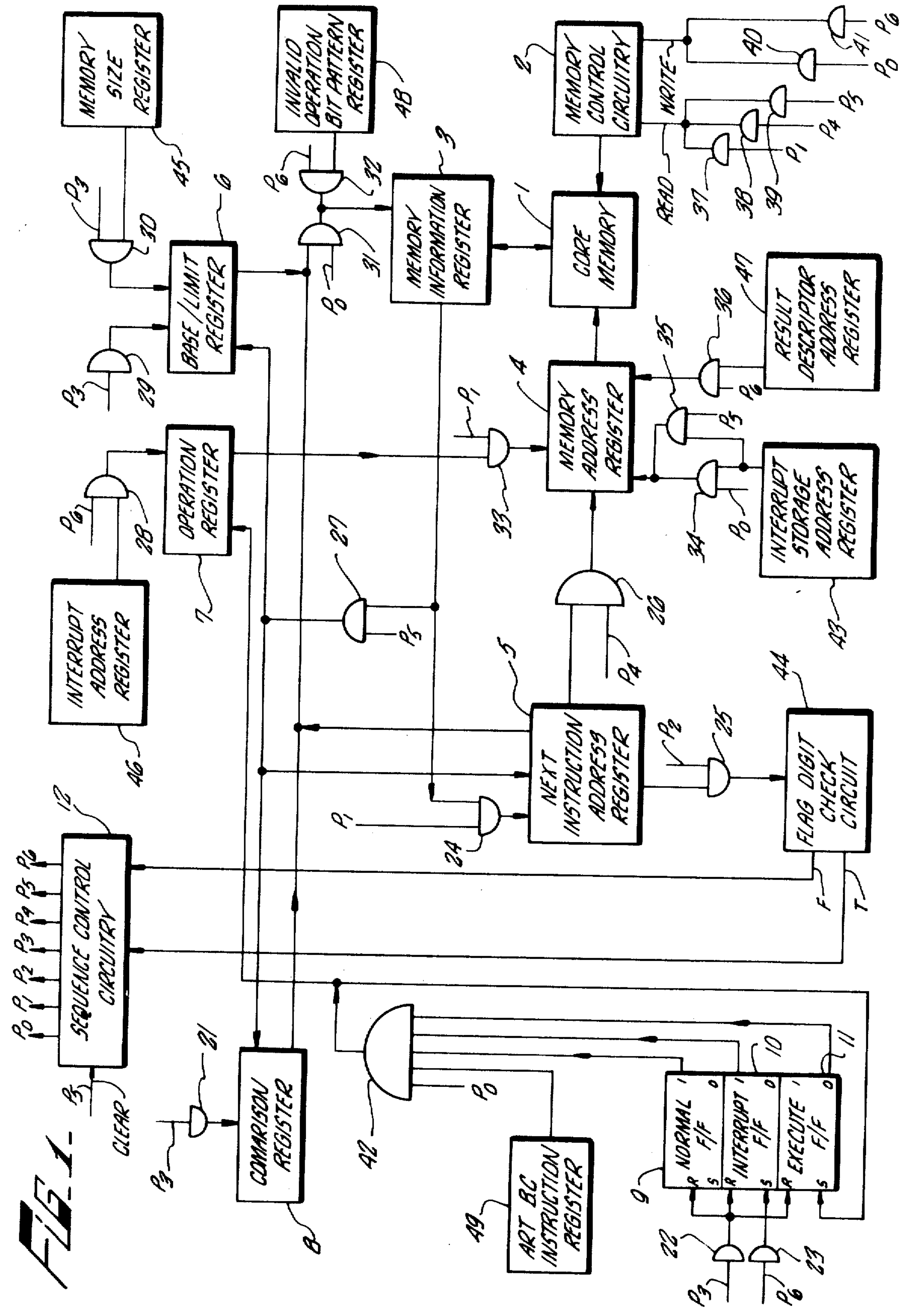
FIG. 1 is a circuit schematic diagram of apparatus that performs the method of the invention.

In FIG. 1, a computer is shown having a memory 1 designated a core memory. Memory control circuitry 2 governs the read-write operations for core memory 1. Generally, the read and write operations would be carried out sequentially in the course of a read-write cycle controlled by the computer clock pulse source. Such techniques are well known in the art. Information is written into and read out of core memory 1 through a memory information register 3. The location in core memory 1 from which information is exchanged with memory information register 3 is determined by the address stored in a memory address register 4.

Figure 2:
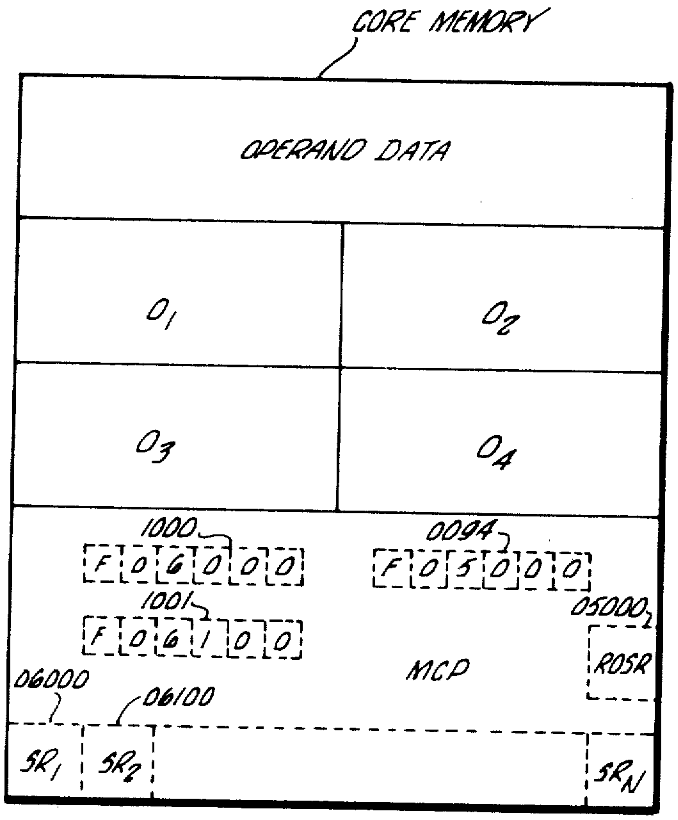
FIG. 2 is a representation of computer memory that is used to explain the invention.

In general, the invention finds application in a multiple program computer, in which a plurality of object programs are carried out under the supervision of a master control program. The master control program, the object programs, and operand data are all stored in core memory 1. This is illustrated by the diagrammatic representation of core memory 1 shown in FIG. 2. In this representation, $O_1$, $O_2$, $O_3$, and $O_4$ are object programs and MCP is the master control program. As further indicated in FIG. 2, the master control program includes many subroutines $SR_1$, $SR_2$ . . . $SR_n$. In the course of the execution of an object program, it is sometimes necessary to carry out one of the subroutines of the master control program. According to the invention, this is acomplished by establishing a direct branch communication from the object program to the desired subroutine of the master control program. For each subroutine, an address word identifying the location of the subroutine is stored as part of the master control program. The object program establishes the branch communication to a subroutine by calling out the location in core memory 1 of the address word corresponding to the desired subroutine. For example, in FIG. 2 subroutine $SR_1$ is stored in the core memory 1 in a location having an address 06000. An address word having a binary coded flag digit and binary coded digits signifying the address 06000 is also stored in core memory 1. This address word is stored in a location having an address 1000. In FIG. 2, the flag digit is designated F. This flag digit is a combination of binary numbers that is unique, i.e., a combination that does not represent any decimal values or appear otherwise in the system except to designate this flag digit. An object program establishes a branch communication to subroutine $SR_1$ by calling for the contents of location 1000 in core memory 1. To protect the computer against error in the object program, the information called for by the object program is checked for the presence of the flag digit. If the check gives a TRUE response, the fetched information is in fact a proper subroutine address word. The apparatus then proceeds to initiate the subroutine corresponding to the selected address word. If the check gives a FALSE response, the information corresponding to the address word is not fetched from core memory 1.

In the latter case, a test subroutine, designated RDSR in FIG. 2, is initiated by the same apparatus that performs the operation described in the preceding paragraph. To make the address word identifying the location in core memory 1 of the test subroutine compatible with this apparatus, it is also provided with the unique flag digit. For the example of FIG. 2, the test subroutine is stored in core memory 1 at address 5000. Accordingly, the address word corresponding to the test subroutine is F05000. This address word is, in turn, located in core memory 1 at address 94. In summary, when the check gives a FALSE response, the information at address 94 is called for. This information contains the flag digit. Thus the test subroutine is initiated. The details of the test subroutine itself are not part of this invention. By way of example, the test subroutine could involve a scan of a group of so-called result descriptors stored in core memory 1. These result descriptors could, for example, indicate the condition of the computer hardware such as whether a console printer is able to accept information. In addition, one result descriptor could be employed to indicate whether or not a flag is contained in the selected address word when a branch communication operation is carried out. In the test subroutine, the result descriptors could be scanned and appropriate action taken depending upon the condition indicated. Generally the scan would take place each time a new result descriptor is stored in memory. Apparatus employing such a test subroutine is disclosed in a copending application of James C. Robertson, entitled "Digital Computer Having Linked Test Operation," filed Sept. 2, 1965, Ser. No. 484,681, which is assigned to the same assignee as the present application. This copending application matured into Pat. 3,363,236 on Jan. 9, 1968. Since the test subroutine itself is not part of this invention, its details are not further elaborated upon in this application.

Reference is made once again to FIG. 1 for a detailed description of the mode of operation of the apparatus shown therein. In the normal course of the execution of a subroutine, the address of each instruction is stored in a next instruction address register 5 prior to application to memory address register 4. In general, the instructions would be stored in sequential positions in core memory 1, so that each address is obtained by counting up the previous address. A base/limit register 6 stores information that determined the base and limit of the portion of core memory 1 to which access may be gained during a particular state of the computer. The contents of register 6 are, therefore, an indication whether instructions of the master control program or of an object program are at any time being carried out and, in the latter case, which object program. When instructions of object program $O_1$ are being executed, for example, base/limit register 6 limits access to core memory 1 to that portion thereof occupied by object program $O_1$. On the other hand, when instructions from the master control program are being executed, base/limit register 6 permits access to the entirety of core memory 1. Operation register 7 stores an operator that initiates the branch communication operation and the address in core memory 1 of the selected address word. A comparison register 8 also stores information that indicates the condition of the computer. Since register 8 plays no direct role in the invention, its function will not be further discussed.

Flip-flops 9, 10, and 11 indicate the condition of the computer in different regards. Normal flip-flop 9 determines the state of the computer with regard to the master control program and the object programs. If the "1" output lead of flip-flop 9 is energized, the computer is in the normal state executing the instructions of an object program. If the "0" output lead of flip-flop 9 is energized, the computer is in the control state executing instructions from the master control program. Interrupt flip-flop 10 indicates that a result descriptor has been stored when its "1" output lead is energized. In other words, the test subroutine is to be initiated. Execute flip-flop 11 defines the state of the machine with regard to the instructions. When the "1" output lead of flip-flop 11 is energized, the machine is executing an instruction. When the "0" output lead is energized, the machine is fetching a new instruction from core memory 1. In addition to the connections to flip-flops 9, 10, and 11 shown in FIG. 1, other connections are also made with other portions of the computer which are not important to the description of this invention.

The operation of the apparatus proceeds under the control of sequence control circuitry 12. Typically, such circuitry includes a clock pulse source, a sequence counter, and combinational logic to carry out the sequence of operations described below. As circuitry 12 steps through a sequential series, output leads $P_0$, $P_1$, $P_2$, $P_3$, $P_4$, $P_5$, and $P_6$ are selectively energized. Leads $P_0$ through $P_6$ are connected to inputs of various AND gates (21 through 42) to carry out the operation of establishing the branch communication. Initially lead $P_0$ is energized, and each time circuitry 12 is cleared lead $P_0$ becomes energized again.

Although not represented in FIG. 1, there is a connection from operation register 7 to each of AND gates 21 through 42. For the purpose of discussion, it is assumed that the operator 50 indicates the branch communicate instruction. When the branch communicate instruction, including the operator 50 and the address in core memory 1 of an address word corresponding to a desired master control program subroutine, is transferred to operation register 7, the lead connecting register 7 to AND gates 21 through 42 is energized and remains energized throughout the entire operation. When this lead becomes energized, step $P_0$ takes place. A fixed address stored in interrupt storage address register 43 is transferred through gate 34 into memory address register 4, while the information stored in next instruction address register 5, base/limit register 6, and comparison register 8 are transferred through gate 31 into memory information register 3. Responsive to gate 40, memory control circuitry 2 writes the information from register 3 into the location in core memory 1, indicated by register 4. The information from registers 5, 6, and 8 thus stored in core memory 1 defines the point in the object program at which the branch communication was established and which object program is involved. By returning this information to registers 5, 6, and 8, after execution of the subroutine in the master control program to which the branch communication is established, the same object program is reinstated. This reinstate operation is described in more detail below.

Next lead $P_1$ is energized. Responsive thereto, information defining the location of the selected address word is transferred from register 7 through gate 33 to memory address register 4. For the example given in connection with FIG. 2, this would be the number 1000. Responsive to the actuation of gate 37, memory control circuitry 2 then reads into memory information register 3 the information in location 1000 of core memory 1, which is the address word F06000. From register 3, this address word passes through gate 24 to next instruction address register 5.

Next, lead $P_2$ is energized. As a result, a connection is established through gate 25 between register 5 and a flag digit check circuit 44. Circuit 44 could be a comparator that compares the first most significant digit of the selected address word with the contents of a register containing the unique flag digit. When the check for a flag digit gives a TRUE indication, i.e. the selected address word contains the flag digit, lead T from circuit 44 to sequence control circuitry 12 is energized. As a result, lead $P_3$ is energized.

At this point, preparations are made to carry out the selected subroutine of the master control program. To this end, gate 29 is actuated to clear the base information from register 6. Information from a memory size register 45 passes through gate 30 to the limit portion of register 6. Consequently, register 6 is set to permit access to the entire contents of core memory 1 as required in the control state. Gate 21 is also actuated to clear comparison register 8 and gate 22 is actuated to reset flip-flops 9, 10, and 11 into their "0" state.

Next lead $P_4$ is energized. As a result, the selected address word passes through gate 26 into memory address register 4 and memory control circuitry 2 reads out the first instruction of the subroutine responsive to the actuation of gate 38. Thereafter, each instruction of the subroutine is, in turn, fetched and executed until the subroutine is completed, at which time, lead $P_5$ is energized.

When lead $P_5$ is energized, the object program is reinstated. To this end, the address stored in interrupt storage address register 43 is transferred through gate 35 to memory address register 4. Responsive to the actuation of gate 39, memory control circuitry 2 reads the information stored in the interrupt storage location of core memory 1 into memory information register 3, from where it is transferred through gate 27 to registers 5, 6, and 8. Thereupon, sequence and control circuitry 12 is cleared so it is ready to repeat its cycle and the computer continues to execute the reinstated object program.

If the object program erroneously designates the location in memory of the selected address word so that information read from core memory 1 does not in fact contain a flag digit, output lead F of flag digit check circuit 44 is energized during step $P_2$. In this case, $P_6$ is energized immediately following lead $P_2$. As a result, gate 23 is actuated to set interrupt flip-flop 10 in the "1" state. The address information in operation register 7 is replaced by informaiton from an interrupt address register 46 coupled to register 7 through gate 28. Register 46 contains address information identifying the location in core memory 1 of the address word for the test subroutine. In terms of the example of FIG. 2, register 46 would contain the number 94. Address information identifying the location in core memory 1 is set aside for storage of the result descriptor for the flag digit check carried out by circuit 44 is stored in a result descriptor address register 47. The contents of register 47 are transferred through gate 36 to memory address register 4. At the same time, the contents of an invalid operation bit pattern register 48 are transferred through gate 32 to memory information register 3. Register 48 contains a bit pattern indicating that a false result has been obtained on the flag digit check, i.e., that an invalid operation has been called for by an object program. Responsive to the actuation of gate 41, the contents of memory information register 3 are written into the address location indicated by register 4.

After step $P_6$, the sequence moves to $P_1$ again. Thereafter leads $P_1$, $P_2$, $P_3$, $P_4$, and $P_5$ are sequentially energized to carry on the previously described operation with respect to the new address information in register 7. Thus, using the example of FIG. 2 the address word F05000 is read out of core memory 1 while lead $P_1$ is energized and this address word is checked for the presence of a flag digit while lead $P_2$ is energized. Since the address information for obtaining the address word F05000 from memory 1 is stored in register 46 no error will occur in fetching this address word from memory 1. Therefore the use of a flag digit in connection with this address word is not necessary as an error check. It does however enable the use of the same apparatus to initiate the test subroutine and the other subroutines. Accordingly, the computer is prepared to perform a master control subroutine when lead $P_3$ is energized and performs the test subroutine when lead $P_4$ is energized. Similarly, the object program is reinstated when lead $P_5$ is energized. However, further execution of this object program would be prevented in response to the sensing of the invalid operation bit pattern during the result descriptor scan routine. The details of this, however, are not considered a part of this invention.

In the situation just described, an interrupt in the execution of the computer instructions is occasioned by the detection of a programmatic error in establishing a branch communication. During this interrupt, a test subroutine called RDSR is carried out. It may be desired to institute a similar interrupt and execute the same test subroutine upon the occurrence of interrupts occasioned by other circumstances in the computer. Generally speaking, it may be desirable to initiate the test subroutine each time a result descriptor is stored in core memory 1. For example, it may be desired to initiate such an interrupt when a piece of input/output equipment such as a console printer has completed the printing of all the information delivered to it and is ready to accept more information. When the conditions are sensed for initiating an interrupt of this type, an artificial branch command is forced into operation register 7. Thereafter, the test subroutine is established by means of the previously described apparatus.

By way of example, it is assumed that the interrupt occasioned by other circumstances is to be initiated when the "1" output of normal flip-flop 9, the "1" output of interrupt flip-flop 10, and the "0" output of the execute flip-flop 11 are energized. If lead $P_0$ is also energized at this time, gate 42 is actuated and to transfer the information from an artificial branch command instruction register 49 to register 7 and to set flip-flop 11. The operator of this instruction is the number 50 and the address information is the number 94, that is the address information identifying the position in memory of the address word corresponding to the test subroutine RDSR.

Figure 3:
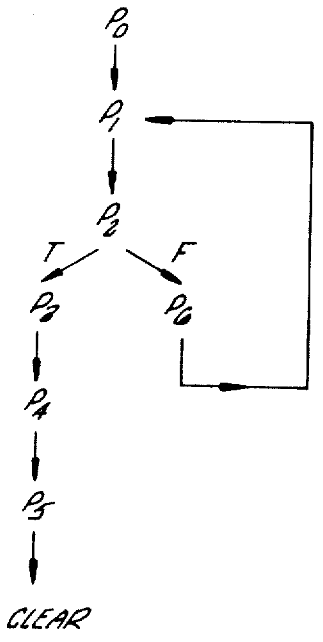
FIG. 3 is a diagram of the two alternative sequences taken by the sequence control circuitry of FIG. 1.

The different sequences carried out by circuitry 12 are depicted graphically in FIG. 3. In every case circuitry 12 steps through $P_0$, $P_1$, and $P_2$. At $P_2$ the address word is checked for the presence of a flag digit. If a flag digit is present circuitry 12 steps through $P_3$, $P_4$, and $P_5$ after which it is cleared to $P_0$ again. If the flag digit is not present, circuitry 12 steps to $P_6$, returns to $P_1$, and then steps through $P_2$, $P_3$, $P_4$, $P_5$ and is cleared.

What is claimed is:

1. A method for establishing a direct branch communication from an object program to one of a number of subroutines of a master control program in a digital computer that operates upon digital words represented by electrical signals, the computer having an addressable memory where a plurality of object programs and a master control program are stored, the method comprising the steps of:

storing in the computer memory address words represented by electrical signals, the address words identifying the locations in the memory of the subroutines, each subroutine address word containing a unique flag digit;

retrieving from the memory the address word of a subroutine to be executed responsive to the occurrence of a branch communication instruction;

checking the retrieved address word for the presence of a flag digit; and retrieving the subroutine corresponding to the checked address word from the memory for execution only if the checked address word contains a flag digit.

2. The method of claim 1 in which the master control program includes a test subroutine, an address word identifying the location in the memory of the test subroutine is stored in the memory, and the test subroutine address word contains the flag digit, the method comprising the additional steps of: retrieving the test subroutine address word if the checked address word fails to contain the flag digit; checking the retrieved test subroutine address word for the flag digit; and retrieving the test subroutine from the memory for execution only if the retrieved test subroutine address word contains a flag digit.

3. The method of claim 1, in which the master control program includes a test subroutine, an address word identifying the location in the memory of the test subroutine is stored in the memory, the test subroutine address word contains the flag digit, and input/output equipment operates in conjunction with the computer, the method comprising the additional steps of: retrieving the test subroutine address word each time an interruption takes place in the operation of the input/output equipment; checking the retrieved test subroutine address word for the flag digit; and retrieving the test subroutine from the memory for execution only if the retrieved test subroutine address word contains a flag digit.

4. The method of claim 1, comprising the additional step of storing information designating the point in the sequence of the object program at which the branch communication instruction occurs in a predetermined location in the memory while the branch communication is being established.

5. The method of claim 1, in which the flag digit is a unique binary value in the computer and the step of checking the retrieved address word is accomplished by comparing the flag digit of the retrieved address word with the contents of a register in which the unique binary value is stored.

6. A method for establishing a direct branch communication from an object program to one of a number of subroutines of a master control program in a digital computer that operates upon digital words represented by electrical signals, the computer having an addressable computer memory, a first register for storing computer instructtions, a second register for storing a memory address, and a third register for storing information to be exchanged with the location in the memory identified by the address stored in the second register, the method comprising the steps of:

storing in the computer memory digital words signifying a plurality of object programs and a master control program having a number of subroutines;

storing in the computer memory a plurality of digital address words identifying the locations of the subroutines in the memory, each subroutine address word containing a special flag digit that is distinguishable from all the other digits utilized in the computer;

transferring from the memory to the third register a selected subroutine address word responsive to the storage of a branch communication instruction in the first register;

checking the selected address word for the presence of the flag digit; and transferring the selected address word from the third register to the second register to initiate the execution of the corresponding subroutine only if the selected address word contains the flag digit.

7. The method of claim 6, in which the master control program includes a test subroutine, one of the address words identifies the location in the memory of the test subroutine, and the test subroutine address word contains the special flag digit, the method further comprising the step of transferring, the test subroutine address word from the memory to the second register to initiate execution of the test subroutine if the selected address word fails to contain the special flag digit.

8. The method of claim 7, in which the test subroutine address word is transferred to the second register by the following steps:

transferring to the first register address information identifying the location in the memory of the test subroutine address word to initiate the transfer of the test subroutine address word from the memory to the third register;

checking the test subroutine address word for the presence of the special digit; and transferring the test subroutine address word to the second register to initiate execution of the test subroutine only if the special digit is present.

9. The method of claim 6, in which the master control program includes a test subroutine, one of the address words identify the location in the memory of the test subroutine, the test subroutine address word contains the special digit, and input/output equipment operates in conjunction with the computer, the method comprising the additional steps of: transferring the branch communication instruction including address information identifying the location in the memory of the test subroutine address word to the first register responsive to the occurrence of an interruption in the operation of the input/output equipment; transferring the test subroutine address word from the memory to the third register; checking the test subroutine address word for the presence of the special flag digit; and transferring the test subroutine address word to the second register to initiate execution of the test subroutine only if the special flag digit is present.

10. In a digital computer, apparatus for establishing a direct branch communication from an object program to a subroutine of a master control program comprising:

an addressable computer memory in which a plurality of object programs and a master control program are stored, the master control program including a plurality of subroutines and address words identifying the location in the memory of each subroutine, each subroutine address word containing a unique flag digit;

a first register for storing computer instructions;

a second register for storing a memory address, the second register being coupled to the computer memory to access the location in the memory identified by the address stored in the second register;

a third register for storing information to be exchanged with the location in the memory identified by the address stored in the second register, the third register being coupled to the computer memory to exchange therewith the information stored in the third register;

first means responsive to the first register when a branch communication instruction is stored therein for transferring from the memory to the third register a selected address word identifying the location in the memory of a subroutine;

second means for checking the selected address word transferred from the memory to the third register for the presence of a flag digit; and third means for transferring the selected address word to the second register to initiate execution of the corresponding subroutine only if the selected address word contains the flag digit.

11. The apparatus of claim 10, in which the master control program includes a test routine and an address word identifying the location in the memory of the test routine, the last-mentioned address word containing a flag digit; and means are provided for transferring the test routine address word to the second register to initiate execution of the test routine if the selected address word fails to contain the flag digit.

12. The apparatus of claim 11, in which the means for transferring the test routine address word comprises means for transferring to the first register address information identifying the location in the memory of the test routine address word such that the first means is responsive thereto; the second means checks the test routine address word; and the third means initiates the test routine.

13. The apparatus of claim 10, in which the master control program includes a test routine and an address word identifying the location in the memory of the test routine, the last-mentioned address word containing a flag digit; input/output equipment operates in conjunction with the computer; and means are provided responsive to the occurrence of an interruption in the operation of input/output equipment for transferring the test routine address word to the second register to initiate execution of the test routine.

14. The apparatus of claim 13, in which the means for transferring the test routine address word comprises means for interposing into the first register the branch communication instruction including address information identifying the location in the memory of the test routine address word such that the first means is responsive thereto; the second means checks the test routine address word; and the third means initiates the test routine.

15. The apparatus of claim 10, in which a fourth register is provided for storing a memory address prior to its transfer to the second register; means are provided for transferring the selected address word in the third register to the fourth register; and the checking means is responsive to the selected address word stored in the fourth register.

16. The apparatus of claim 10, in which the means for transferring a selected address word from the memory to the third register includes means for transferring to the second register an address portion of the branch communication instruction in the first register identifying the location in the memory of the selected address word to cause the selected address word to be transferred from the memory to the third register.

17. The apparatus of claim 10, in which means are provided for storing information designating the point in the sequence of the object program at which the branch communication instruction occurs in a predetermined location in the memory while the branch communication is being established.

18. In a digital computer, apparatus comprising:

an addressable memory in which a plurality of object programs and a master control program are stored, the master control program including a plurality of subroutines and address words identifying the location in the memory of each subroutine;

each subroutine address word containing a special digit;

a first register for storing computer instructions;

a second register for storing a memory address, the second register being coupled to the computer memory to access the location in the memory identified by the address stored in the second register;

a third register for storing information to be exchanged with the location in the memory identified by the address stored in the second register, the third register being coupled to the computer memory to exchange therewith the information stored in the third register;

means responsive to the first register when a branch communication instruction is stored therein for transferring from the memory to the third register a selected address word identifying the location in the memory of a subroutine;

means for sensing the presence or absence of the special digit of the selected address word transferred from the memory to the third register;

means for transferring the selected address word to the second register to initiate execution of the corresponding subroutine responsive to the sensing means when the special digit is present; and means for preventing the execution of the subroutine responsive to the sensing means when the special digit is absent.

19. A method for establishing a direct branch communication from an object program to one of a number of subroutines of a master control program in a digital computer that operates upon digital words represented by electrical signals, the computer having an addressable memory where a plurality of object programs and a master control program are stored, the method comprising the steps of:

storing in the computer memory address words represented by electrical signals, the address words identifying the locations in the memory of the subroutines, each subroutine address word containing a unique flag digit;

storing in the computer memory instruction words represented by electrical signals, the instruction words including a branch communication instruction with an address portion identifying the location in the memory of the address word of a subroutine to be executed;

retrieving from the memory the address word of the subroutine to be executed responsive to the address portion of the branch communication instruction;

checking the retrieve address word for the presence of a flag digit; and retrieving the subroutine corresponding to the checked address word from the memory for execution only if the checked address word contains the flag digit.

References Cited

UNITED STATES PATENTS 3,292,155 12/1966 Neilson ........... 340—172.5

RAULFE B. ZACHE, Primary Examiner